Figure 5:
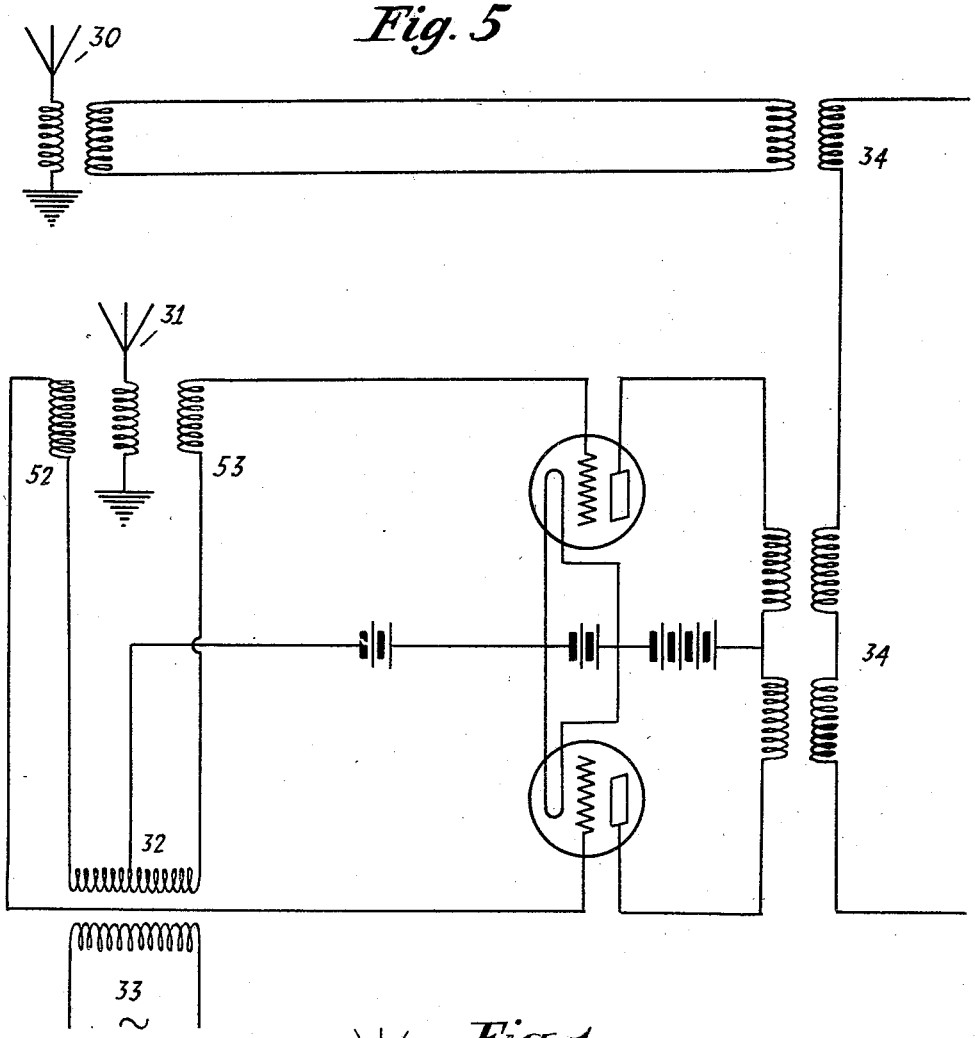

Aug. 18, 1931. H. H. BEVERAGE ET AL 1,819,589
MEANS FOR ELIMINATION OF FADING ON SHORT WAVE LENGTHS
Original Filed Jan. 2, 1926  4 Sheets-Sheet 1

INVENTOR
HAROLD H BEVERAGE
BY HAROLD O. PETERSON

ATTORNEY

Aug. 18, 1931.   H. H. BEVERAGE ET AL   1,819,589
MEANS FOR ELIMINATION OF FADING ON SHORT WAVE LENGTHS
Original Filed Jan. 2, 1926   4 Sheets-Sheet 3

INVENTOR
HAROLD H. BEVERAGE
HAROLD O. PETERSON
BY Ira J. Adams
ATTORNEY

Patented Aug. 18, 1931

1,819,589

UNITED STATES PATENT OFFICE

HAROLD H. BEVERAGE AND HAROLD O. PETERSON, OF RIVERHEAD, NEW YORK, ASSIGNORS TO RADIO CORPORATION OF AMERICA, A CORPORATION OF DELAWARE

MEANS FOR ELIMINATION OF FADING ON SHORT WAVE LENGTHS

Application filed January 2, 1926, Serial No. 78,768, and in the Netherlands December 31, 1926.

This invention relates to the elimination of what is commonly known as fading in wireless or radio signalling. It is particularly adapted for use in sending and receiving of short waves and in locations where fading is particularly troublesome.

Various theories have been suggested for the explanation of the phenomenon known as fading but it is believed that to date no authentic proven theory has been developed. However, certain evidences and phenomena in connection with fading have been discovered in practical observations. Some of these observations have brought out the fact that short wave signals fade differently at points separated by as little as 500 feet and that the phase relation between these points has been found to reverse several times during a minute. This is, of course, an extreme case but where the two points are separated at a distance of several miles, this is quite common. For this reason, several methods which have been suggested wherein the phase of the signals coming in at two different points has permanently been adjusted by means of phase correcting devices these systems have been found of little advantage over systems not using them. The difficulty has always been that the relative phase of the signal is continually varying, even between nearby points, and fixed phase relations with short wave lengths cannot be obtained by geographical separation, as commonly used on long waves.

Such observations indicate the importance of combining the signals from several receivers in such a manner as to be independent of signal phase in space. For example, if the oscillations from two or more antennæ are brought to a common point and combined, the relative phase of the signal oscillations from the different antennæ is continually shifting. In two antennæ each may have a strong signal which might periodically swing completely out of phase, resulting in zero signal at the common point. If the combining is made independent of signal phase, the signal would always be heard as long as there was any signal voltage induced in either antenna. Several methods already suggested describe a method of combining several antennæ at signal frequency in haphazard fashion. Observations, as indicated above, have shown that haphazard combination is probably not very effective, whereas combination independent of phase relation is found more effective than might be expected.

There are a great many ways of combining several antennæ in such a manner as to be independent of phase relation but no attempt will here be made to describe all of them which should be obvious to one skilled in the art. Only a few of the more preferred forms will be explained.

Figure 1:
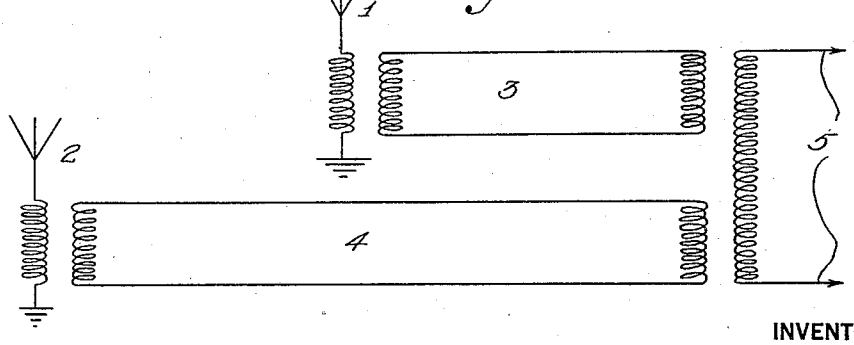

Referring particularly to the drawings, Fig. 1 shows a simple method of haphazard combination. This method is rather ineffective because of the signal phase continually shifting between the various antennæ.

Figure 2:
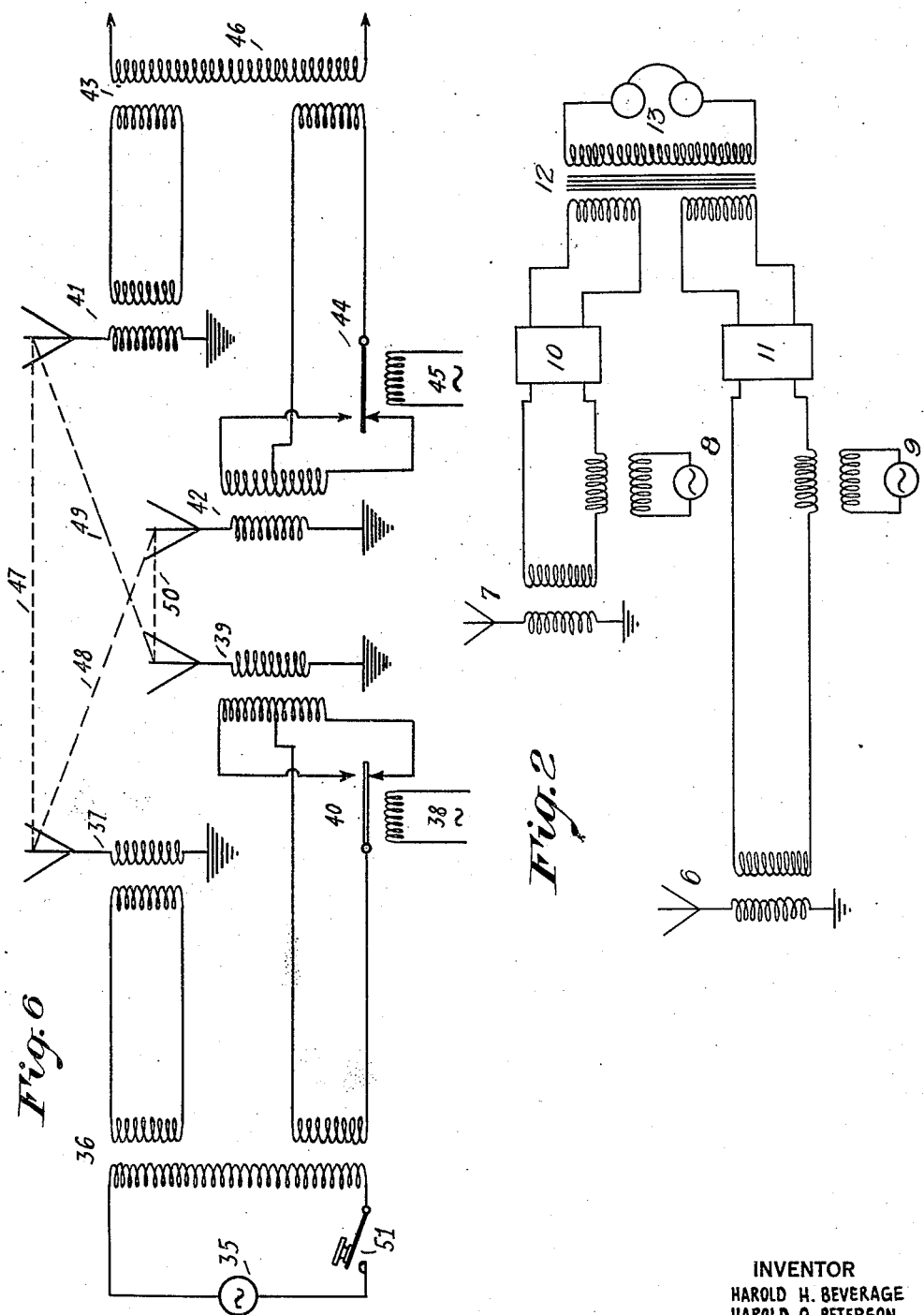

Fig. 2 shows another method for combining the oscillations independent of phase relation and is considerably more effective than the method shown in Fig. 1.

Figure 3:
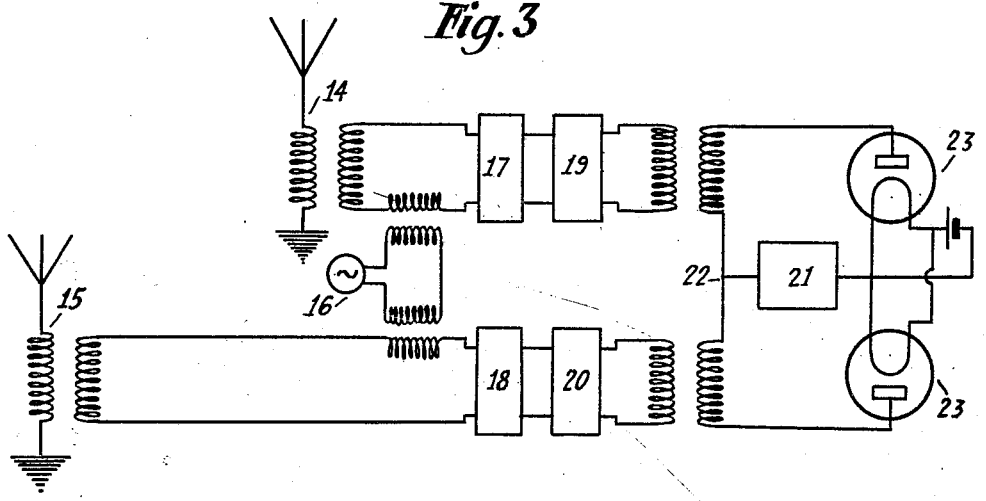
Figure 4:
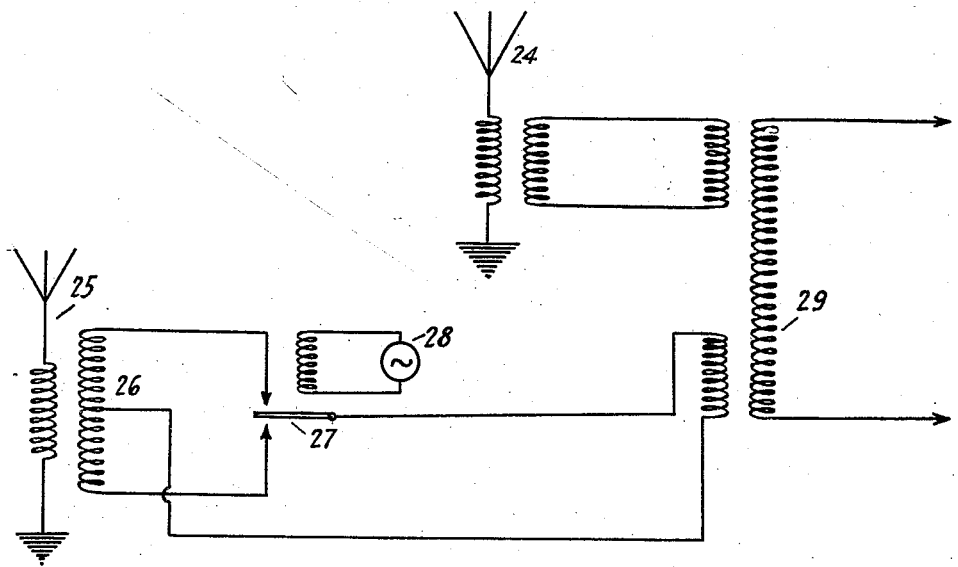

Figs. 3 to 5 inclusive and 7 show other methods of obtaining this combination independent of phase relation.

Fig. 6 shows an arrangement utilizing the method of phase reversal at both sending and receiving stations. These phase reversals may be operated synchronously or not, as desired. Various combinations and detailed methods of operation might be possible with this arrangement.

Further and more definite objects and advantages of the use of this system will appear in connection with these figures of the drawings in the following specification and claims:—

1 and 2 of Fig. 1 show two antennæ coupled to the transmission lines 3 and 4 to a single coupling coil with connections at 5 to either a sending or a receiving apparatus. This arrangement while advantageous for some purposes, does not entirely prevent fading, because two signal oscillation trains may be received on both antennæ at the same time but may be 180 degrees out of phase from each other in such a way as to entirely neutralize in any receiving apparatus connected at 5. The same would be true of any sending apparatus but with opposite effect.

6 and 7 of Fig. 2 are geographically separated antennæ coupled to transmission systems to which is coupled local heterodyne oscillators 8 and 9. The rectifiers 10 and 11 transmit a beat frequency through the uniting transformer 12 which is connected to the phones 13. It can be seen from this that the audio frequencies are combined after detection and are determined by the audio frequency phase relation caused by both signal and oscillator phase. Since the oscillators are separate, the audio frequencies may be and preferably are made different and each audio frequency exists independently as long as signal energy is coming in on that particular antenna irrespective of phase. When several antennæ are combined in this manner, the character of the composite tone changes as fading occurs in the individual receivers, but the tone never disappears entirely unless the signal is zero at all the receivers simultaneously. A practical limit in the number of receivers is soon reached when it is necessary to rectify the composite audio frequency. This rectification thereby brings out the beats between components so it is essential to separate the audio frequencies far enough to give several cycles of the lowest beat note per dot of signalling frequency.

For example, assuming the circuit is operated at 100 words per minute. This corresponds to a dot frequency of 40 cycles per second. It would therefore be necessary to separate the audio frequencies 200 cycles to give 5 cycles to a dot. This would limit the practical number of antennæ to 6 or 8 at the most.

This modification is covered in our copending application Serial Number 261,738, filed March 15, 1928.

14 and 15 of Fig. 3 also show antennæ separated by an appreciable distance and whose output circuits are coupled to a single heterodyne oscillator 16, and connected to rectifiers 17 and 18 and to amplifiers 19 and 20 respectively. 21 is a signal recorder of a well known type for recording a signal which affects the antennæ, and vacuum tubes 23 are arranged for the purpose of rectifying the different signals as they affect the two circuits connected to the recorder. It can be seen from this that voltages produced from one antenna will affect one circuit, while those produced on the other antenna affect the other circuit and since recorder 21 is in both circuits it will always be operated as long as the signal exists in either. With this arrangement any number of rectifiers may be connected in parallel and any number of antennæ used.

This modification is covered in our copending application Serial Number 261,736, filed March 15, 1928.

Making the reference to Fig. 4, 24 and 25 indicate antennæ separated by an appreciable distance, antenna 24 being coupled directly through a transmission line to a common connecting coupling. Antenna 25 is coupled to a double coil 26, which has a central connection leading to the transmission line and to the combining coil 29 coupling. The other end of this combining coil coupling is connected to a vibrator 27 which contacts with the outer ends of the double coil 26. This vibrator is operated by an oscillating circuit 28 and may be operated at 60 cycles or more. This arrangement has proven the most preferable.

If more antennæ are used, they should be connected through similar or the same apparatus as is used with antenna 25 so that only one antenna is directly connected to the combining coil.

In the operation of this arrangement, the couplings to the antenna are adjusted to give equal average signal intensities. If the intensities from the two antennæ remain about the same, no change will result from a phase relation difference of 180 degrees or any other phase relation, because the output of one antenna is reversed several times per signal dot or dash as the case may be, making the average result independent of phase. If the signal fades on one antenna, it will still be heard on the other antenna. The signal from the reversed antenna sounds almost the same whether the reversing relay is operated or not. The only difference is that the relay introduces side bands which result in a slight change in the character of the signal.

This same principle may be applied to any number of antennæ, each antenna having a separate reversing device. Any number of signals can be received from the same antennæ and each signal will receive the benefit of the fading elimination.

The modification shown in Fig. 5 discloses a push-pull coupling tube arrangement which would be reversed by a local oscillator. 30 and 31 are diagrammatic showings of antennæ separated apart. Antenna 30 is coupled through a transmission line directly to the combining coils 34. Antenna 31 is coupled to the push-pull amplifier through coils 52 and 53 which is controlled by a local oscillator 33 at 32 to reverse the direction of oscillation in respect to the combining coils 34. Where a high frequency of reversal is obtained, there arises a disadvantage of producing side bands on other signals which might interfere but this can be eliminated by any known means such as filters or tuned circuits, etc. By using a super-audible frequency for reversal, this device may be applied to telephony for eliminating fading and ether distortion. If more antennæ were used, they should be connected through the push-pull coupling tube arrangement as shown in connection with antenna 31.

There is also evidence derived from observations that antennæ having different directional characteristics but located at or near the same place show entirely different degrees of fading. For example, it might be advantageous to combine a horizontal loop with a vertical loop; a wave antenna with a vertical antenna, etc. For short waves the vertical directive diagram is of importance as well as the horizontal directive diagram arrangement. Thus, instead of connecting ordinary types of antenna as shown in the various figures, any one of the other known types of directive or distorting antenna might be used in any combination desirable. This type of combination is dependent upon the natural characteristics of the surroundings and no general law has been discovered which would apply in all cases. The best arrangement can only be determined by experimentation at a particular place. While it is probably easier and cheaper to apply the dephasing principle at the receiver, there is no reason why the same principle could not be applied at the transmitter. A common transmitter could be used to feed two or more spaced antennæ, each having a separate phase reversal device.

Such an arrangement is shown in Fig. 6 where 35 is a source of radio frequency oscillations modulated by the key or other device 51 and coupled directly to the antenna 37 but through a vibrator 40 to the antenna 39. The vibrator 40 is operated by a local source of oscillations 38. The oscillations produced by the sending arrangement could be received by a device such as is shown in Fig. 4 or any other of the disclosures. Thus, if antennæ 41 and 42 were coupled to a common output coil 46, the additional advantage of preventing fading and phase reversal at the receiving end as well as the transmitting end would be obtained. 43 would be the coupling coil to the combining coil 46 for antenna 41 while the coupling from antenna 42 would be made to the vibrating reverser 44 operated by the source of oscillations 45. From the figure, it can be seen that four different paths might be taken by the oscillations as indicated at 47, 48, 49 and 50, thus assuring continuous transmission.

Figure 7:
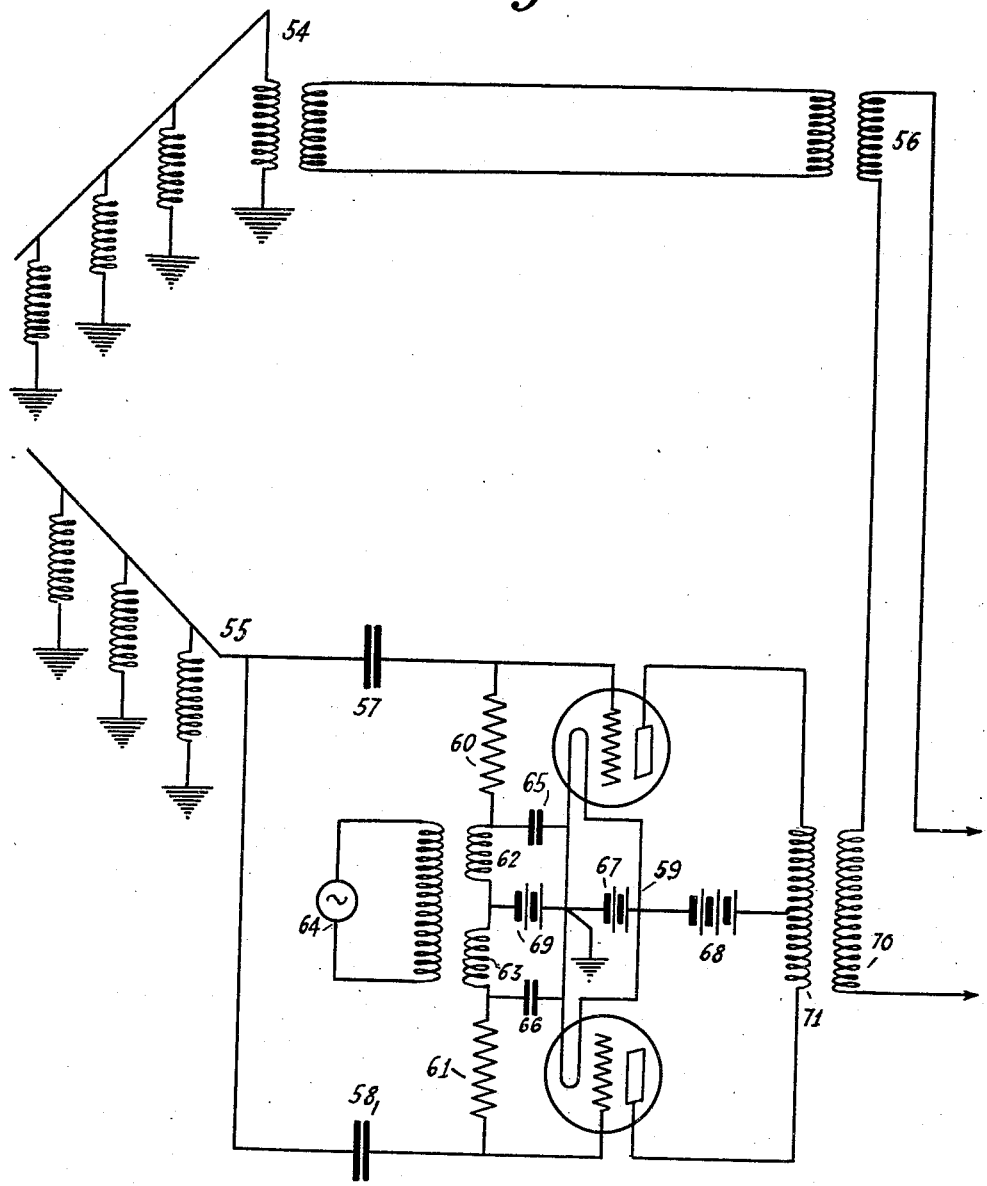

Another variation of the connections of Fig. 5 is shown in Fig. 7. Here 54 and 55 are the antennæ with impedance coils connected to ground. 54 is directly coupled to the output coupling. The antenna 55 is capacitatively coupled at 57 and 58 to the push-pull tube arrangement 59. Here resistance elements 60 and 61 are connected to balanced coupling coils 62 and 63, coupled to oscillator 64. By-pass condensers 65 and 66 allow the oscillatory current to pass around the circuit which they are in and tend to keep the two ends of coils 62 and 63 at the same instantaneous potential. The customary A, B and C batteries are shown at 67, 68 and 69 respectively. The output coils are shown at 70 coupled to coil 71. Thus the two outputs of antennæ 54 and 55 appear at the circuit 56 and 70.

If an oscillation is now impressed equally on the two antennæ reversal of the oscillator 64 will first block the transmission through one tube and then the other. In this way first one output coil at 70 will be energized and then the other according to the rate of oscillation. The oscillations may be at an audible or a super-audible rate.

Also it is obvious that antennæ having different directive characteristics located at the same point might as well be used as two non-directional antennæ at different points. Such antennæ might be of the kind indicated at 54 and 55 of Fig. 7.

The type of phase reversal devices might as well be rotating contact devices, rotating capacity couplers, time lag devices of different values, such as an artificial line for successively controlling the grids of coupling tubes associated with the several antennæ, etc.

It is not intended to be limited to the exact modification shown, but any of the modifications above described might as well be used within the scope of the following claims.

We claim:

1. The method of receiving wireless signals with geographically separated aerials which comprises, receiving the same signal upon each of a pair of geographically separated aerials to produce a pair of signal effects, continuously varying the relative phases of the said received effects to eliminate prolonged phase opposition of the separate signal effects, and combining said received effects, whereby the effects of fading are substantially reduced.

2. The method of receiving wireless signals with geographically separated aerials which comprises, receiving the same signal upon each of a pair of geographically separated aerials to produce a pair of signal effects, continuously varying the relative phases of the said received effects at a rate corresponding to an audible frequency to eliminate prolonged phase opposition of the separate signal effects, and combining said received effects, whereby the effects of fading are substantially reduced.

3. The method of receiving wireless signals with geographically separated aerials which comprises, receiving the same signal upon each of a pair of geographically separated aerials to produce a pair of signal effects, continuously varying the relative phases of the said received effects at a rate at least as great as an audible frequency to eliminate prolonged phase opposition of the separate signal effects, and combining said received effects, whereby the effects of fading are substantially reduced.

4. The method of receiving wireless signals with geographically separated aerials which comprises, receiving the same signal upon each of a plurality of geographically separated aerials to produce a plurality of signal effects, continuously varying the relative phases of the said received effects to eliminate prolonged phase opposition of the separate signal effects, and combining said received effects, whereby the effects of fading are substantially reduced.

5. The method of receiving wireless signals with geographically separated aerials which comprises, receiving the same signal upon each of a pair of geographically separated aerials to produce a pair of signal effects continuously varying the phase of one of the signals to eliminate prolonged phase opposition of the separate signal effects, and combining said received effects, whereby the effects of fading are substantially reduced.

6. The method of receiving wireless signals with geographically separated aerials and a radio frequency combining circuit which comprises, receiving the same signal upon each of a pair of geographically separated aerials to produce a pair of radio frequency currents, continuously varying the relative phases of the received radio frequency currents to eliminate prolonged phase opposition of the separate radio frequency currents, and combining said received radio frequency currents, whereby the effects of fading are substantially reduced.

7. The method of receiving wireless signals with geographically separated aerials and a radio frequency combining circuit which comprises, receiving the same signal upon each of a plurality of geographically separated aerials to produce a plurality of radio frequency signal currents, continuously varying the relative phases of the received radio frequency currents to eliminate prolonged phase opposition of the separate radio frequency currents, and combining said received radio frequency currents, whereby the effects of fading are substantially reduced.

8. The method of receiving wireless signals which comprises, receiving the same signal upon a plurality of spaced aerials continuously altering the relative phase of the signal energy received on a pair of the aerials, and combining the said received signals at a combining point independently of the variations in the relative phase of the signals at the aerials.

9. The method of receiving wireless signals with geographically separated aerials and a radio frequency combining circuit which comprises, receiving the same signal upon each of a pair of geographically separated aerials to produce a pair of radio frequency signal currents, continuously reversing the phase of one of the received radio frequency currents to eliminate prolonged phase opposition of the separate radio frequency currents, and combining the said received radio frequency currents whereby the effects of fading are substantially reduced.

10. The method of receiving wireless signals with geographically separated aerials and a radio frequency combining circuit which comprises, receiving the same signal upon each of a plurality of geographically separated aerials to produce a plurality of radio frequency signal currents, continuously reversing the phase of one of the received radio frequency currents to eliminate prolonged phase opposition of the separate radio frequency currents, and combining the said received radio frequency currents whereby the effects of fading are substantially reduced.

11. Apparatus for the elimination of fading comprising, a plurality of spaced antennæ each adapted to receive the same signal effect, a combining circuit, connecting lines connecting each separate antenna to said combining circuit, and means associated with at least one of said connecting lines for continually changing the phase of the received signal effect transmitted through said line.

12. Apparatus for the elimination of fading comprising a pair of geographically spaced antennæ each adapted to receive the same signal effect, a combining circuit, connecting lines connecting each separate antenna to said combining circuit, and means associated with one of said connecting lines for continually reversing the phase of the received signal effect transmitted through said line.

13. Apparatus for the elimination of fading comprising, a pair of geographically spaced antennæ each adapted to receive the same signal effect, a combining circuit, connecting lines connecting each of said antennæ to said combining circuit, and means associated with one of said connecting lines for continually changing the phase of the signal effect received upon one of the said antennæ systems with respect to the effect received on the other of said antennæ systems and transferred to the said connecting lines for eliminating prolonged phase opposition of the separate signal effects in said combining circuit.

14. Apparatus for the elimination of fading comprising, a pair of antenna systems each of different receptive characteristics and arranged to receive the same signal effect, a combining circuit, connecting lines connecting each of said antenna systems with said combining circuit, and means associated with one of said connecting lines for continually changing the combining phase characteristic of the received signal from one antenna with respect to the phase of the signal from the other of said antennæ whereby the resultant signals impressed upon said combining circuit are combined independently of the relative phase variations of the said signals received upon said antenna systems.

15. Apparatus for the elimination of fading comprising, a plurality of geographically separated antennæ systems, a common combining circuit for the signal energy received on all of said antenna systems, lines connecting all of said antenna systems with said combining circuit, and means associated with at least one of said connecting lines for continually reversing the phase of the signal impressed from the associated antenna system, said reversal of phase being at a rate which at least approaches an audible frequency.

16. Apparatus for the elimination of fading comprising a pair of geographically spaced antennæ each adapted to receive the same signal effect, a combining circuit, connecting lines between each antenna and said combining circuit, and a reversing means for continually reversing the phase of the incoming signal effect in one of said connecting lines, said reversing means being adapted to so modify the incoming signal energy in said connecting line that the signals from each of said connecting lines are combined in said combining circuit independently of the relative signal phase at said antennæ.

17. Apparatus for the elimination of fading comprising, a plurality of geographically spaced antennæ systems, a common combining circuit for all of said antennæ systems, a link circuit connecting one of said antennæ systems with said combining circuit, a signal modification circuit connecting another antenna system with said combining circuit, and means associated with said modification circuit for continually reversing the phase of the signals transferred thereto from its antenna system, whereby prolonged phase opposition of signals reaching said combining circuit is eliminated.

18. Apparatus claimed in claim 17 wherein said phase reversing means includes a pair of thermionic tubes, said tubes being connected push-pull fashion, and means for alternately biasing said tubes to cut-off.

19. Apparatus claimed in claim 17 wherein said phase reversing means includes, a pair of thermionic tubes connected in said modification circuit and arranged push-pull fashion, said tubes having their output circuit coupled with said combining circuit, and means for alternately passing current through each of said tubes, whereby the signal energy transferred to said combining circuit is continually reversed in direction.

20. Apparatus claimed in claim 17 wherein said phase reversing means includes, a pair of push-pull connected thermionic tubes associated with said signal modification circuit, and an oscillator coupled to the input circuits of said tubes, said oscillator being adapted to alternately bias the input electrodes of said tubes to cut-off and to positively bias the said electrodes during each cycle of said oscillator, whereby the said tubes alternately pass current to said combining circuit and the direction of said transferred current is continually reversed.

21. The method of signalling which includes collecting signal energy at a plurality of separated points, continuously and periodically altering the phase of the energy collected at one point relative to the phase of the energy collected at another point, and combining the energies relatively altered in phase.

22. Signalling apparatus comprising a plurality of geographically separated energy collectors, a single combining circuit coupled thereto and means for varying periodically and continuously the relative phase of energies fed into the combining circuit.

23. Apparatus for the elimination of fading comprising a plurality of geographically spaced antennæ systems a plurality of which have relatively different directional characteristics, a common combining circuit for all of said antennæ systems, a link circuit connecting one of said antennæ systems with said combining circuit, a signal modification circuit connecting another antenna system with said combining circuit, and means associated with said modification circuit for continually and periodically reversing the phase of the signals transferred thereto from its antenna system whereby prolonged phase opposition of signals reaching said combining circuit is eliminated.

24. Signalling apparatus comprising a plurality of geographically separated energy collectors a plurality of which have relatively different directional characteristics, a single combining circuit coupled thereto, and means for varying periodically and continuously the relative phase of energies fed into the combining circuit.

HAROLD H. BEVERAGE.
HAROLD O. PETERSON.